(12) United States Patent
Goto et al.

(10) Patent No.: US 6,501,232 B1
(45) Date of Patent: Dec. 31, 2002

(54) ELECTRIC POWER UNIT FOR ELECTRIC DISCHARGE SURFACE TREATMENT AND METHOD OF ELECTRIC DISCHARGE SURFACE TREATMENT

(75) Inventors: Akihiro Goto, Tokyo (JP); Toshio Moro, Tokyo (JP); Masao Akiyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/936,345

(22) PCT Filed: Jan. 11, 2000

(86) PCT No.: PCT/JP00/00053
§ 371 (c)(1),
(2), (4) Date: Sep. 12, 2001

(87) PCT Pub. No.: WO01/51240
PCT Pub. Date: Jul. 19, 2001

(51) Int. Cl.[7] .............................. G05F 1/00; B23H 1/00
(52) U.S. Cl. .................................. 315/291; 219/69.13
(58) Field of Search ........................... 315/209 R, 291, 315/293, 297, 300, 302, 306, 307, 308, DIG. 5; 219/76.13, 79, 69.1, 69.13, 69.2, 69.15, 69.18

(56) References Cited

U.S. PATENT DOCUMENTS

| | | | | |
|---|---|---|---|---|
| 4,645,895 A | * | 2/1987 | Boxman et al. | 118/50.1 |
| 4,645,981 A | * | 2/1987 | Stramke | 118/50.1 |
| 4,719,327 A | * | 1/1988 | Haruki | 219/69.13 |
| 4,792,730 A | * | 12/1988 | Mintchev et al. | 315/209 SC |
| 5,024,506 A | * | 6/1991 | Hardin et al. | 385/102 |
| 5,283,414 A | * | 2/1994 | Straemke | 204/298.36 |
| 5,804,789 A | * | 9/1998 | Saito et al. | 219/69.17 |
| 5,897,792 A | * | 4/1999 | Kaneko et al. | 219/69.18 |
| 6,130,510 A | * | 10/2000 | Kurihara et al. | 219/69.13 |
| 6,144,175 A | * | 11/2000 | Parra | 315/209 R |
| 6,348,668 B1 | * | 2/2002 | Moro et al. | 219/69.17 |

FOREIGN PATENT DOCUMENTS

| | | | |
|---|---|---|---|
| JP | 51158301 | 5/1910 | B22F/3/10 |
| JP | 4-348814 | 12/1992 | B23H/1/02 |
| JP | 5-148615 | 6/1993 | C23C/10/28 |
| JP | 6-182626 | 7/1994 | B23H/9/00 |
| JP | 9-192937 | 7/1997 | B23H/9/00 |
| JP | 9-285917 | 11/1997 | B23H/3/02 |

OTHER PUBLICATIONS

A. Goto, et al, vol. BERICHTE NR. 1405, 1998, "Formation of Hard Layer on Metallic Material by EDM" Proceedings of ISEM, p. 271–278.

* cited by examiner

Primary Examiner—Don Wong
Assistant Examiner—Minh D A
(74) Attorney, Agent, or Firm—Sughrue Mion, PLLC (57) ABSTRACT

In the first pulse width T1 of an electric discharge current, the group of switching elements (10) are controlled by the control means (11) and the first peak value Ip1 is set at a predetermined value and the electrode material is emitted so that a predetermined quantity of electrode material can be supplied, and the thus emitted electrode material is made to adhere to the workpiece (2) so as to compose the electrode component (15a). In the second pulse width T2 of an electric discharge current, the second peak value Ip2 is set so that the emission of electrode material can be suppressed and the electrode component (15a) adhering to the workpiece (2) can be melted, and the electrode component (15a) is melted and a hard coat composed of the electrode component (15b) melted on the workpiece (2) is formed. In this way, an excellent hard coat, the crystal grains of which are fine, can be formed on the workpiece (2).

4 Claims, 7 Drawing Sheets

ELECTRIC POWER UNIT FOR ELECTRIC DISCHARGE SURFACE TREATMENT AND METHOD OF ELECTRIC DISCHARGE SURFACE TREATMENT

TECHNICAL FIELD

The present invention relates to improvements in an electric power unit for electric discharge surface treatment, and also the present invention relates to improvements in a method of electric discharge surface treatment, by which a hard coat made of electrode material or a hard coat made of electrode material, which has reacted by electric discharge energy, is formed on a surface of a workpiece by energy of electric discharge when the electric discharge is generated between the electrode for electric discharge surface treatment and the workpiece.

BACKGROUND ART

Concerning the prior art by which a hard coat is formed on a surface of a workpiece so as to endow the workpiece with a corrosion resistance and abrasion resistance property, for example, Japanese Unexamined Patent Publication No. 5-148615 discloses a method of electric discharge surface treatment. According to the patent publication, there is provided a method of electric discharge surface treatment of metal including the steps of: conducting a primary processing (accumulation processing) in which a pressed powder electrode, which is an electrode for electric discharge surface treatment formed by compressing powder of WC (tungsten carbide) and Co (cobalt), is used; and conducting a secondary processing (remelting processing) in which the electrode is replaced with an electrode made of copper, the electrode consumption of which is relatively small. According to this method, it is possible to form a hard coat having a strong adhering force with respect to steel, however, it is impossible to form a hard coat having a strong adhering force with respect to sintered material such as cemented carbide.

However, according to the investigations made by the present inventors, the following knowledge has been found out. When an electrode for electric discharge surface treatment made of material such as Ti (titanium) capable of forming a hard carbide is used and electric discharge is generated between the electrode and metal of a workpiece, it is possible to form a strong hard coat on the metal surface of the workpiece without being subjected to the process of remelting. The reason why the strong hard coat is formed on the metal surface is that the electrode material, which has consumed by electric discharge, reacts with C (carbon) which is a component of processing solution, so that TiC (titanium carbide) can be created. Also, the following knowledge has been found out. When a pressed powder electrode, which is an electrode for electric discharge surface treatment made of metal hydride such as $TiH_2$ (hydrogenation titanium), is used and an electric discharge is generated between the pressed powder electrode and the metal of a workpiece, it possible to form a hard coat more quickly, the adhering property of which is higher than that of a case in which Ti is used. Further, the following knowledge has been found out. When a pressed powder electrode, which is an electrode for electric discharge surface treatment in which hydrogenation compound such as $TiH_2$ is mixed with other metal or ceramics, is used and an electric discharge is generated between the pressed powder electrode and the metal of a workpiece, it is possible to quickly form a hard coat of various hardness and abrasion resistance property.

Figure 5:
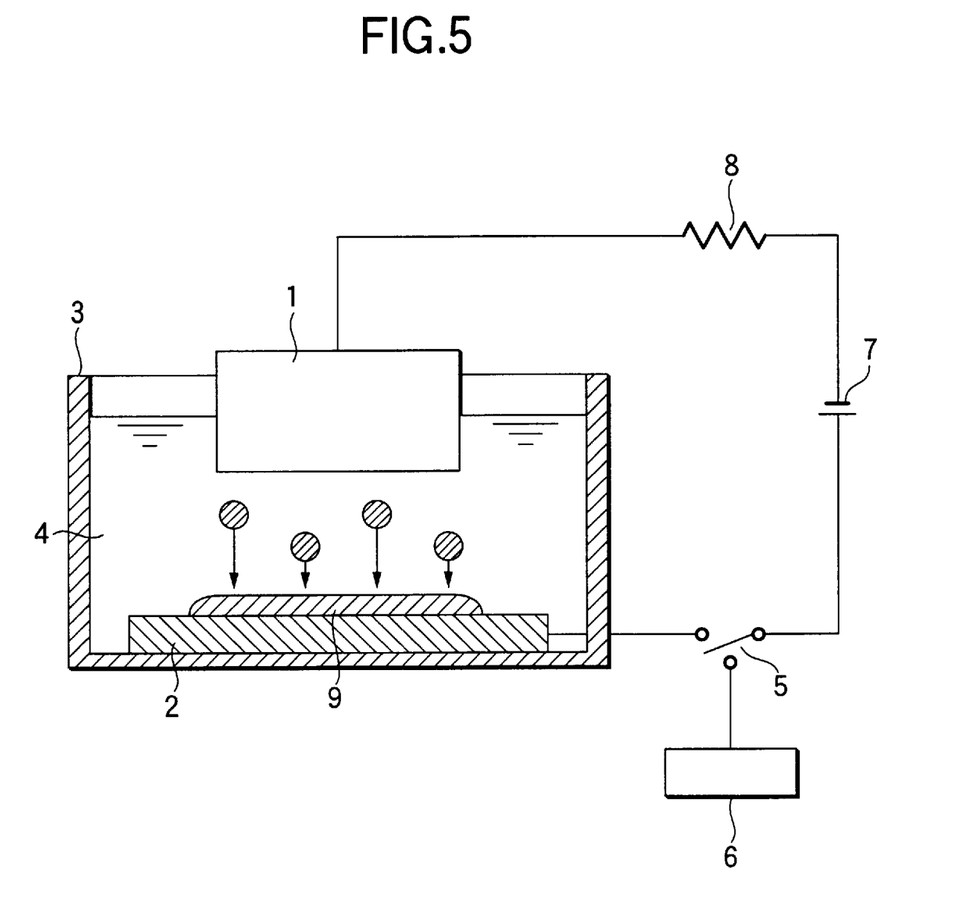
FIG. 5 is an arrangement view showing an example of a device used for electric discharge surface treatment.

The above method is disclosed, for example, in Japanese Unexamined Patent Publication No. 9-192937. FIG. 5 is an arrangement view showing an example of the device used for the electric discharge surface treatment described above. In FIG. 5, reference numeral 1 is a pressed powder electrode which is composed of compressed powder of $TiH_2$, reference numeral 2 is a workpiece, reference numeral 3 is a processing tank, reference numeral 4 is a processing solution, reference numeral 5 is a switching element for switching a voltage and current impressed upon between the pressed powder electrode 1 and the workpiece 2, reference numeral 6 is a control means for controlling by turning on and off the switching element 5, reference numeral 7 is an electric power unit, reference numeral 8 is a resistor, and reference numeral 9 is a hard coat which has been formed. According to the above structure, when an electric discharge is generated between the pressed powder electrode 1 and the workpiece 2, the hard coat 9 can be formed on a surface of the workpiece 2 made of steel or cemented carbide by the electric discharge energy. In this structure, the switching element 5, control means 6, electric power unit 7 and resistor 8 correspond to an electric power unit for electric discharge surface treatment to determine a waveform of a pulse of an electric discharge current when the electric discharge surface treatment is conducted.

Figure 6:
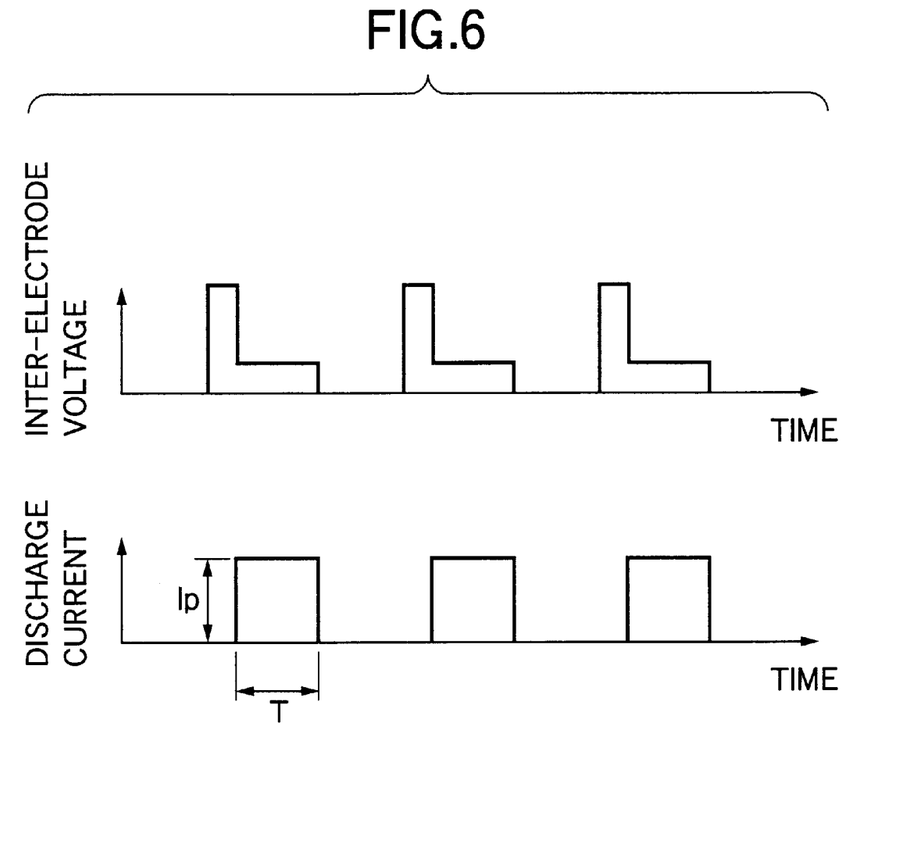
FIG. 6 is a view showing a voltage between electrodes and also showing an electric discharge current pulse in a conventional electric power unit for electric discharge surface treatment.

In the above conventional electric power unit for electric discharge surface treatment, an electric discharge current pulse, the waveform of which is rectangular, is basically used. As shown in FIG. 6, when peak value Ip of the electric discharge current and pulse width T are changed, the thickness of a coat formed on a workpiece is adjusted.

Figure 7:
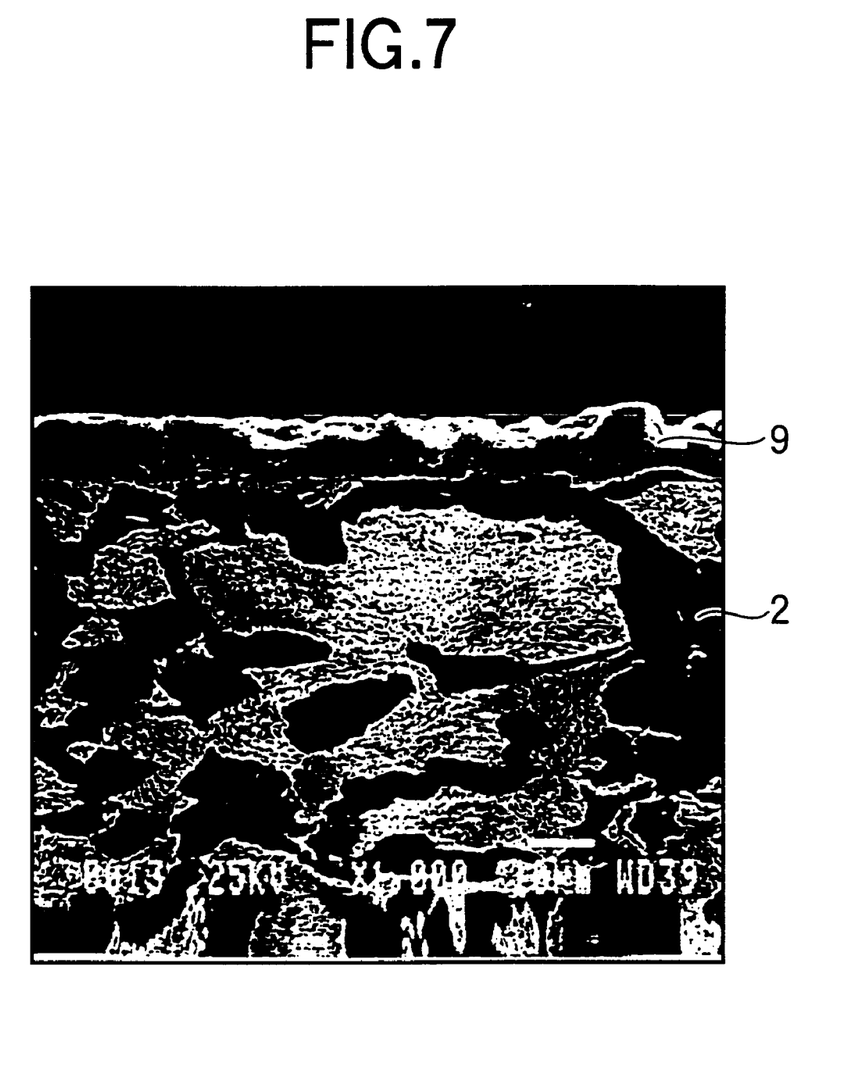
FIG. 7 is a photograph showing a cross section of a hard coat formed on a workpiece by electric discharge surface treatment in which a conventional electric discharge current pulse is used.

FIG. 7 is a photograph showing a cross section of the hard coat 9 formed on the workpiece 2 by electric discharge surface treatment in which the conventional electric discharge current pulse is used. On the photograph, it is possible to observe a state in which blow holes exist on the hard coat 9 and the material is not sufficiently melted in the process of forming the hard coat 9.

The following problems may be encountered in the conventional electric discharge surface treatment. As described above, since quick heating and quick cooling are repeatedly conducted in the electric discharge surface treatment in which the conventional electric discharge current pulse is used, blow holes exist on the hard coat formed on the workpiece, that is, it is impossible to form a tight hard coat. Further, residual stress remains on the surface which has been subjected to electric discharge surface treatment. Due to the influence of the residual stress, there is a possibility that cracks are caused on the surface which has been subjected to electric discharge surface treatment.

SUMMARY OF THE INVENTION

The present invention has been accomplished to solve the above problems. It is an object of the present invention to provide an electric power unit for electric discharge surface treatment and a method of electric discharge surface treatment capable of forming a tight hard coat on a workpiece without causing defects such as cracks on the surface of the workpiece.

The present invention provides an electric power unit for electric discharge surface treatment by which electric discharge is generated between an electrode for electric discharge surface treatment and a workpiece so that a hard coat is formed on a surface of the workpiece by energy of the electric discharge, the electric power unit for electric discharge surface treatment comprising: a control means for dividing an electric discharge current pulse into a first pulse width T1 (first peak value Ip1), a second pulse width T2 (second peak value Ip2), . . . , and an n-th pulse width Tn (n-th peak value Ipn) (n is an integer 2 and more), the control means for setting the k-th pulse width Tk and the k-th peak value Ipk ($1 \leq k \leq (n-1)$, k is an integer) so that a quantity of supply of the hard coat material by the emission of the electrode material can be a predetermined value previously determined according to a predetermined processing condition, the control means for setting the n-th peak value Ipn so that the emission of the electrode material can be suppressed and the electrode component adhering to the workpiece can be melted, and the control means for setting the n-th pulse width Tn at the time corresponding to the predetermined melting condition of the hard coat.

The present invention also provides an electric power unit for electric discharge surface treatment by which electric discharge is generated between an electrode for electric discharge surface treatment and a workpiece so that a hard coat is formed on a surface of the workpiece by energy of the electric discharge, the electric power unit for electric discharge surface treatment comprising: a control means for setting an electric discharge current waveform in the substantial first half of the electric discharge current pulse width so that a quantity of supply of the hard coat material by the emission of the electrode material can be a value corresponding to a predetermined processing condition, and the control means for setting an electric discharge current waveform in the substantial second half of the electric discharge current pulse width so that the emission of the electrode material can be suppressed and an electrode component adhering to the workpiece can be melted according to a predetermined melting condition.

The present invention also provides a method of electric discharge surface treatment for forming a hard coat on a surface of a workpiece by which electric discharge is generated between an electrode for electric discharge surface treatment and the workpiece so that the hard coat is formed on the surface of the workpiece by the energy of electric discharge, the method of electric discharge surface treatment comprising the steps of: dividing an electric discharge current pulse into a first pulse width T1 (first peak value Ip1), a second pulse width T2 (second peak value Ip2), . . . , and an n-th pulse width Tn (n-th peak value Ipn) (n is an integer 2 and more) setting the k-th pulse width Tk and the k-th peak value Ipk ($1 \leq k \leq (n-1)$, k is an integer) so that a quantity of supply of the hard coat material by the emission of the electrode material can be a predetermined value previously determined according to a predetermined processing condition; setting the n-th peak value Ipn so that the emission of the electrode material can be suppressed and the electrode component adhering to the workpiece can be melted; and setting the n-th pulse width Tn at the time corresponding to the melting condition of the hard coat.

The present invention also provides a method of electric discharge surface treatment for forming a hard coat on a surface of a workpiece by which electric discharge is generated between an electrode for electric discharge surface treatment and the workpiece so that the hard coat is formed on the surface of the workpiece by the energy of electric discharge, the method of electric discharge surface treatment comprising the steps of: setting an electric discharge current waveform in the substantial first half of the electric discharge current pulse width so that a quantity of supply of the hard coat material by the emission of the electrode material can be a value corresponding to a predetermined processing condition; and setting an electric discharge current waveform in the substantial second half of the electric discharge current pulse width so that the emission of the electrode material can be suppressed and an electrode component adhering to the workpiece can be melted according to a predetermined melting condition, so as to form the hard coat on the surface of the workpiece.

Since the present invention is composed as described above, the following effects can be provided by the present invention.

According to the electric power unit for electric discharge surface treatment and the method of electric discharge surface treatment of the present invention, the hard coat material can be appropriately supplied and melted. Therefore, it is possible to form a tight hard coat on a workpiece.

The hard coat formed on the workpiece is gradually cooled without being subjected to the repetition of quick heating and cooling. Therefore, it is possible to decrease defects such as cracks caused on a hard coat.

BEST MODE FOR CARRYING OUT THE INVENTION

EMBODIMENT 1

Figure 1A:
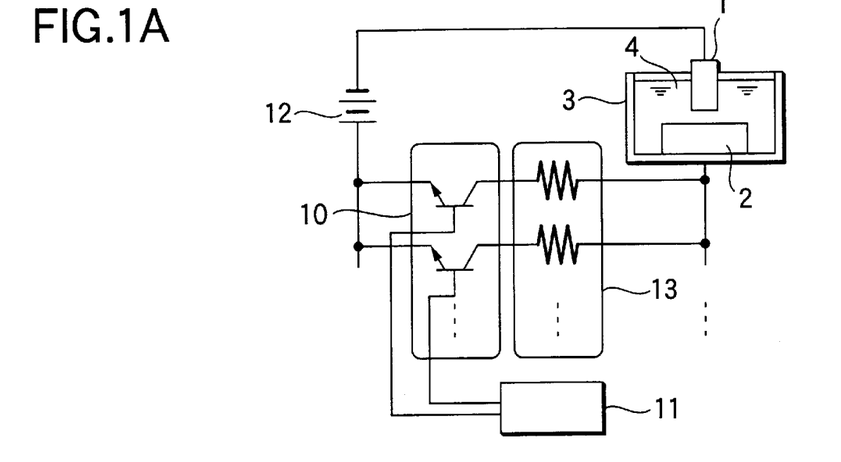
FIGS. 1A to 1C are views showing an arrangement of an electric power unit for electric discharge surface treatment of Embodiment 1 of the present invention.
Figure 1B:
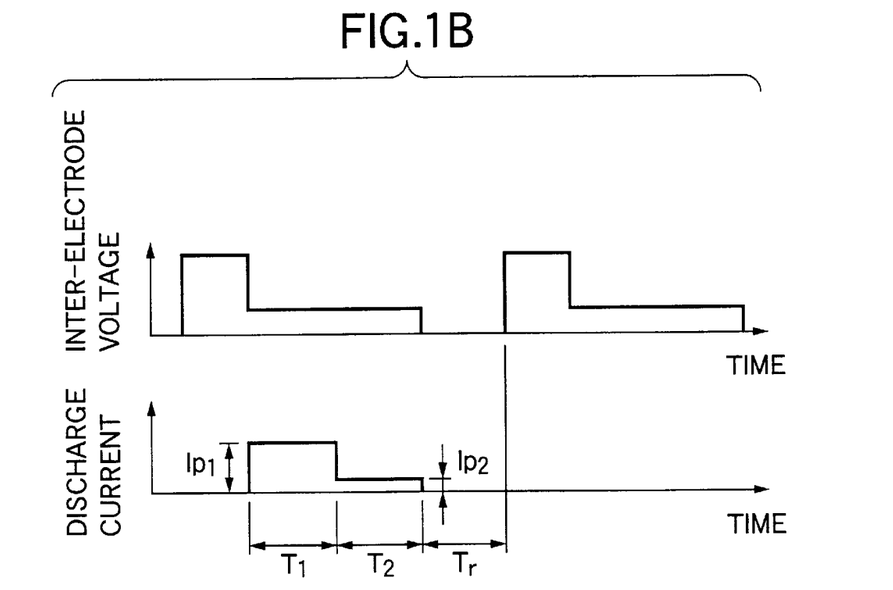
Figure 1C:
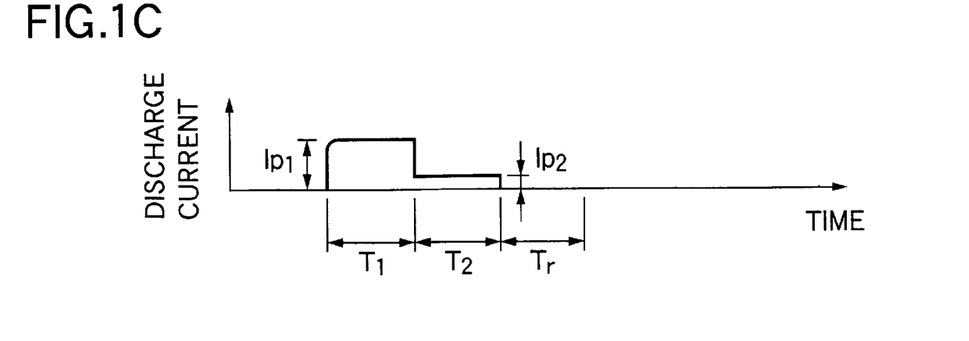

FIGS. 1A to 1C are views showing an electric power unit for electric discharge surface treatment of Embodiment 1 of the present invention, wherein FIG. 1A is an arrangement view, FIG. 1B is a view showing a voltage between electrodes and also showing an electric discharge current, and FIG. 1C is a view showing another example of the electric discharge current. In FIGS. 1A to 1C, reference numeral 1 is an electrode for electric discharge surface treatment, reference numeral 2 is a workpiece, reference numeral 3 is a processing tank, reference numeral 4 is a processing solution, reference numeral 10 is a group of switching elements, reference numeral 11 is a control means for controlling by turning on and off the group of switching elements 10, reference numeral 12 is an electric power unit, reference numeral 13 is a group of resistors, T1 is a first pulse width, T2 is a second pulse width, Tr is a recess time, Ip1 is a first peak value, and Ip2 is a second peak value. The group of switching elements 10, control means 11, electric power unit 12 and group of resistors 13 correspond to an electric power unit for electric discharge surface treatment to determine a waveform of the electric discharge current pulse in the process of electric discharge surface treatment.

Next, operation will be explained below. The electrode 1 for electric discharge surface treatment and the workpiece 2 are opposed to each other in the processing solution 4, and a predetermined interval is kept between them by a drive unit not shown in the drawing. A voltage is impressed between the electrode 1 for electric discharge surface treatment and the workpiece 2 by the switching element which is turned on by the control means 11, so that an electric discharge is generated after a predetermined period of time. This electric discharge is detected, and after the first pulse width T1 has passed, the switching element to be turned on is changed over by the control means 11, so that the electric discharge current is decreased. Then, after the second pulse width T2 has passed, the switching element is turned off by the control means 11. Further, after the recess time Tr has passed, the switching element is turned on again by the control means 11. Electric discharge surface treatment is conducted by repeating the above operation.

The electric discharge current pulse may be like a step as shown in FIG. 1B. Alternatively, a rising portion of the electric discharge current pulse may be like a slope as shown in FIG. 1C. The electric discharge current pulse can be increased like a slope by the method in which inductance is inserted in series into the electric power circuit of the electric power unit for electric discharge surface treatment.

Figure 2A:
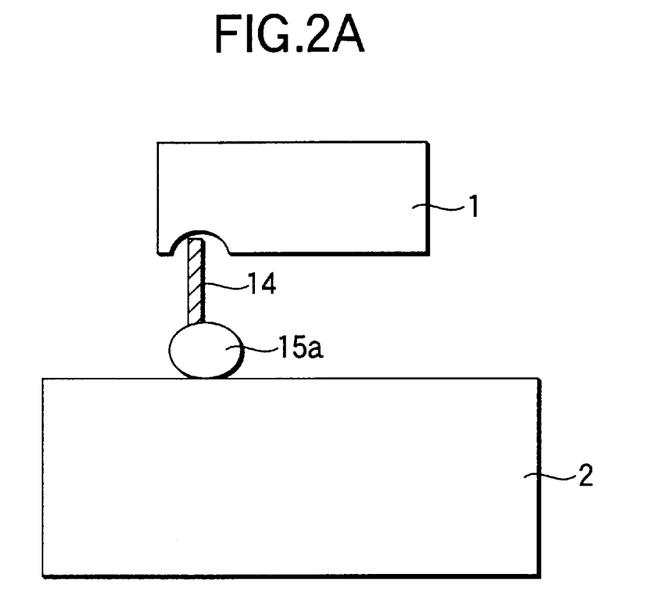
FIGS. 2A and 2B are schematic illustrations showing the circumstances of formation of a hard coat on a workpiece by electric discharge surface treatment in which an electric power unit for electric discharge surface treatment of Embodiment 1 of the present invention is used.
Figure 2B:
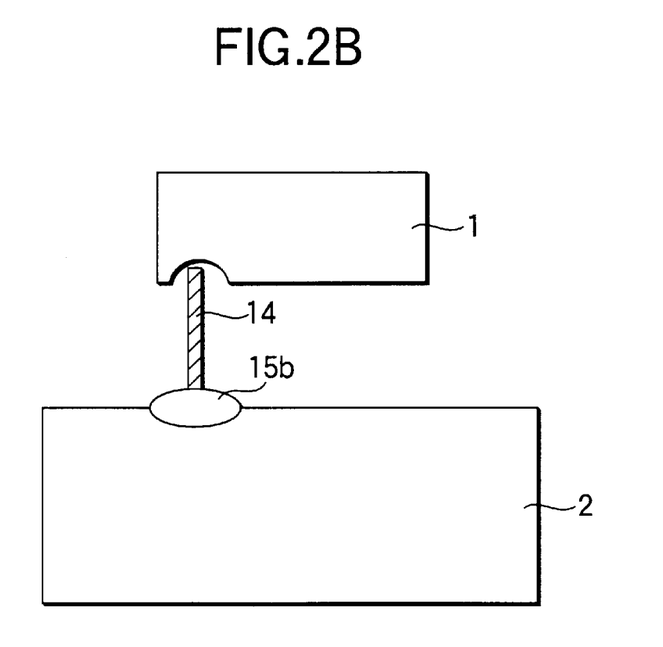

FIGS. 2A and 2B are schematic illustrations showing the circumstances of formation of a hard coat on a workpiece by electric discharge surface treatment in which an electric power unit for electric discharge surface treatment of Embodiment 1 of the present invention is used. In the drawing, reference numeral 1 is an electrode, reference numeral 2 is a workpiece, reference numeral 14 is an electric discharge arc column, reference numeral 15a is an electrode component adhering to the workpiece 2, and reference numeral 15b is an electrode component which has been melted. FIG. 2A shows a state corresponding to the portion of the first pulse width T1 shown in FIG. 1B or 1C. FIG. 2B shows a state corresponding to the portion of the second pulse width T2 shown in FIG. 1B or 1C.

In the first pulse width T1 shown in FIG. 1B or 1C, in order to make a quantity of supply of hard coat material by the emission of electrode material to be a value previously determined according to a predetermined processing condition, the group of switching elements 10 are controlled by the control means 11, so that the first peak value Ip1 can be a predetermined value and the electrode material can be emitted while the density of the electric current flowing between predetermined electrodes is being kept. In this way, the electrode component 15a adhering to the workpiece 2 is formed as shown in FIG. 2A.

Next, in the second pulse width T2 shown in FIG. 1B or 1C, it is set that the emission of electrode material is suppressed by reducing the second peak value Ip2 to be lower than the first peak value Ip1, and at the same time, it is set that the electrode component 15a adhering to the workpiece 2 can be melted, so that the electrode component 15a is melted. Due to the foregoing, the electrode component 15b, which has been melted on the workpiece 2, is formed as shown in FIG. 2B. The second pulse width T2 is set at the time corresponding to the melting condition of a predetermined hard coat.

Figure 3:
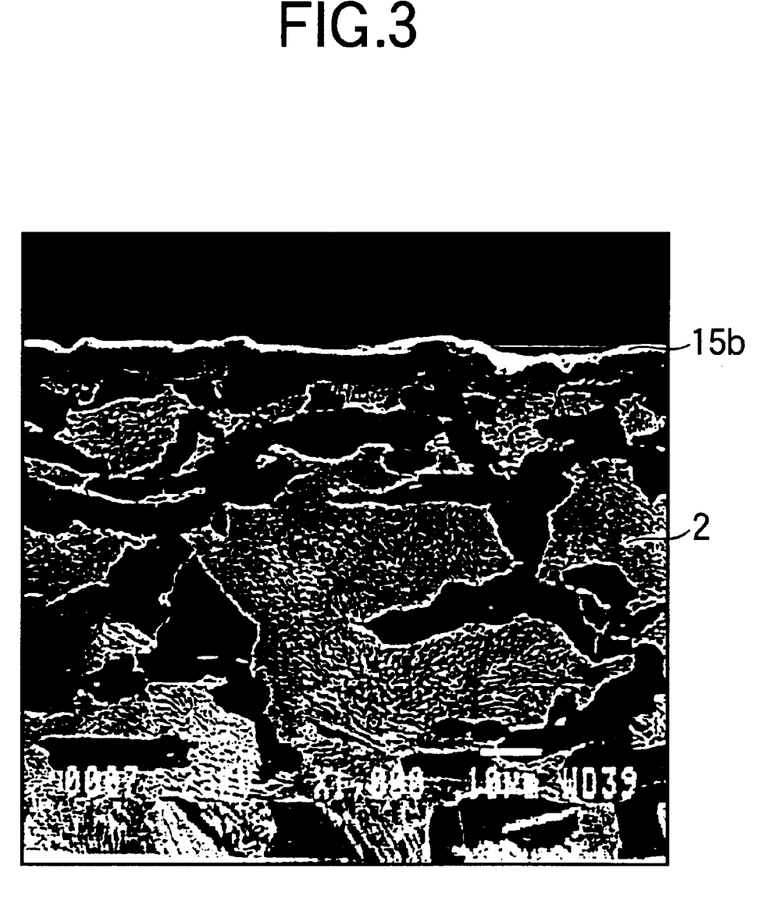
FIG. 3 is a photograph showing a cross section of a hard coat formed on a workpiece by electric discharge surface treatment in which an electric power unit for electric discharge surface treatment of Embodiment 1 of the present invention is used.

FIG. 3 is a photograph showing a cross section of a hard coat, which is composed of the electrode component 15b, formed on a workpiece 2 by electric discharge surface treatment in which an electric power unit for electric discharge surface treatment of Embodiment 1 of the present invention is used. It is set that the emission of electrode material is suppressed by decreasing the second peak value Ip2 to be lower than the first peak value Ip1, and at the same time the electrode component 15a adhering to the workpiece 2 can be melted. The second pulse width T2 is set at the time corresponding to the melting condition of a predetermined hard coat. Due to the foregoing, compared with FIG. 7 showing the conventional example, blow holes seldom exist on the hard coat, that is, it is possible to form a hard coat tighter than that of the conventional example.

As described above, material of the hard coat formed on the workpiece can be appropriately supplied and melted by the electric discharge current pulse shown in FIG. 1B or 1C. Therefore, it is possible to form an excellent hard coat, the crystal grains of which are fine.

The hard coat formed on the workpiece is not subjected to the repetition of quick heating and cooling, that is, the hard coat formed on the workpiece is gradually cooled. Therefore, it is possible to reduce the occurrence of defects such as cracks on the hard coat.

In the above explanation, the peak value of the electric discharge current is like two steps, however, it should be noted that the electric discharge current is like three or more steps. In each section of the pulse width, the electric current of the electric discharge current pulse may not be constant or may not be like a slope but the electric current may be a predetermined time function.

EMBODIMENT 2

Figure 4A:
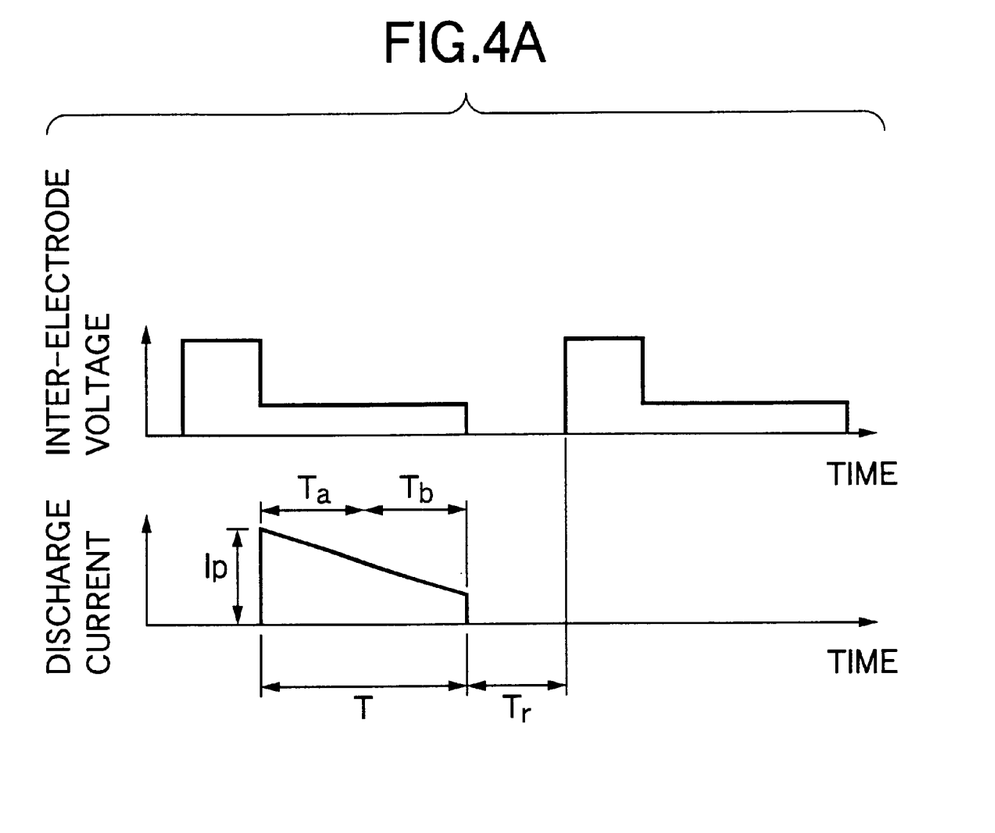
FIGS. 4A and 4B are views showing a voltage between electrodes and also showing an electric discharge current in an electric power unit for electric discharge surface treatment of Embodiment 2 of the present invention.
Figure 4B:
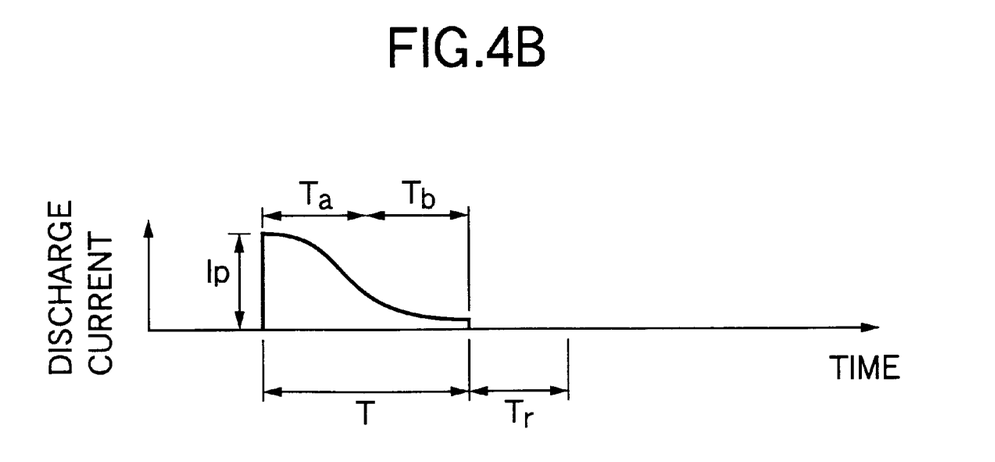

FIGS. 4A and 4B are views showing a voltage between electrodes and also showing an electric discharge current in an electric power unit for electric discharge surface treatment of Embodiment 2 of the present invention. In the drawing, T is a pulse width of an electric discharge current, Ta is a substantial first half of pulse width T, Tb is a substantial second half of pulse width T, Tr is a recess time, and Ip is a peak value of an electric discharge current. The electric discharge current waveform is a function of time. There is a tendency that the electric discharge current waveform decreases together with the lapse of time after the electric discharge current has risen to the peak value Ip. It is possible to determine a pattern of decrease in this electric discharge current shown in FIGS. 4A and 4B, for example, by an experiment in which consideration is given to a predetermined processing condition, facilitation of tightening a hard coat formed on the workpiece and prevention of quick cooling. Setting of the electric discharge current waveform shown in FIG. 4A or 4B is conducted with respect to the substantial first half portion Ta of pulse width T and the substantial second half portion Tb of pulse width T. That is, the electric discharge current waveform in the substantial first half portion Ta of pulse width T is set so that a quantity of supply of hard coat material by the emission of electrode material can be a value according to a predetermined processing condition, and the electric discharge current waveform in the substantial second half portion Tb of pulse width T is set so that the emission of electrode material can be suppressed and the electrode component adhering to the workpiece can be melted by a predetermined melting condition.

Next, operation will be explained below. The electric power unit for electric discharge surface treatment of Embodiment 2 is arranged in the same manner as that of Embodiment 1 shown in FIG. 1A. The electrode 1 for electric discharge surface treatment and the workpiece 2 are opposed to each other in the processing solution 4, and a predetermined interval is kept between them by a drive unit not shown in the drawing. A voltage is impressed between the electrode 1 for electric discharge surface treatment and the workpiece 2 by the switching element, which is turned on by the control means 11, of the group of switching elements 10, so that an electric discharge is generated after a predetermined period of time. After the generation of electric discharge has been detected, the switching elements in the group of switching elements 10 are changed over in order, so that the electric discharge current can be gradually decreased according to a predetermined decreasing pattern of the electric discharge current waveform. By the combination of the step-like electric discharge current patterns, which are made by changing over the switching elements of the group of switching elements 10, it is possible to approximately realize a pattern in which the electric discharge current is reduced as shown in FIG. 4A or 4B.

According to the electric discharge current waveform shown in FIGS. 4A and 4B, the electric discharge current is reduced with the lapse of time according to a predetermined decreasing pattern of the electric discharge current waveform. Therefore, the hard coat formed on the workpiece is not quickly heated and cooled but gradually cooled. Therefore, it is possible to provide an effect of decreasing defects such as cracks caused on a hard coat.

INDUSTRIAL APPLICABILITY

As explained above, the electric power unit for electric discharge surface treatment and the method of electric discharge surface treatment of the present invention are suitable for the surface treatment industry in which a hard coat is formed on a workpiece.

What is claimed is:

1. An electric power unit for electric discharge surface treatment by which electric discharge is generated between an electrode for electric discharge surface treatment and a workpiece so that a hard coat is formed on a surface of the workpiece by energy of the electric discharge, the electric power unit for electric discharge surface treatment comprising: a control means for dividing an electric discharge current pulse into a first pulse width T1 (first peak value Ip1), a second pulse width T2 (second peak value Ip2), . . . , and an n-th pulse width Tn (n-th peak value Ipn) (n is an integer 2 and more), the control means for setting the k-th pulse width Tk and the k-th peak value Ipk ($1 \leq k \leq (n-1)$, k is an integer) so that a quantity of supply of the hard coat material by the emission of the electrode material can be a predetermined value previously determined according to a predetermined processing condition, the control means for setting the n-th peak value Ipn so that the emission of the electrode material can be suppressed and the electrode component adhering to the workpiece can be melted, and the control means for setting the n-th pulse width Tn at the time corresponding to the predetermined melting condition of the hard coat.

2. An electric power unit for electric discharge surface treatment by which electric discharge is generated between an electrode for electric discharge surface treatment and a workpiece so that a hard coat is formed on a surface of the workpiece by energy of the electric discharge, the electric power unit for electric discharge surface treatment comprising: a control means for setting an electric discharge current waveform in the substantial first half of the electric discharge current pulse width so that a quantity of supply of the hard coat material by the emission of the electrode material can be a value corresponding to a predetermined processing condition, and the control means for setting an electric discharge current waveform in the substantial second half of the electric discharge current pulse width so that the emission of the electrode material can be suppressed and an electrode component adhering to the workpiece can be melted according to a predetermined melting condition.

3. A method of electric discharge surface treatment for forming a hard coat on a surface of a workpiece by which electric discharge is generated between an electrode for electric discharge surface treatment and the workpiece so that the hard coat is formed on the surface of the workpiece by the energy of electric discharge, the method of electric discharge surface treatment comprising the steps of: dividing an electric discharge current pulse into a first pulse width T1 (first peak value Ip1), a second pulse width T2 (second peak value Ip2), . . . , and an n-th pulse width Tn (n-th peak value Ipn) (n is an integer 2 and more); setting the k-th pulse width Tk and the k-th peak value Ipk ($1 \leq k \leq (n-1)$, k is an integer) so that a quantity of supply of the hard coat material by the emission of the electrode material can be a predetermined value previously determined according to a predetermined processing condition; setting the n-th peak value Ipn so that the emission of the electrode material can be suppressed and the electrode component adhering to the workpiece can be melted; and setting the n-th pulse width Tn at the time corresponding to the predetermined melting condition of the hard coat.

4. A method of electric discharge surface treatment for forming a hard coat on a surface of a workpiece by which electric discharge is generated between an electrode for electric discharge surface treatment and the workpiece so that the hard coat is formed on the surface of the workpiece by the energy of electric discharge, the method of electric discharge surface treatment comprising the steps of: setting an electric discharge current waveform in the substantial first half of the electric discharge current pulse width so that a quantity of supply of the hard coat material by the emission of the electrode material can be a value corresponding to a predetermined processing condition; and setting an electric discharge current waveform in the substantial second half of the electric discharge current pulse width so that the emission of the electrode material can be suppressed and an electrode component adhering to the workpiece can be melted according to a predetermined melting condition, so as to form the hard coat on the surface of the workpiece.

* * * * *